United States Patent [19]

Yamashita et al.

[11] Patent Number: 4,611,087

[45] Date of Patent: Sep. 9, 1986

[54] SALTS OF ALKENYLSUCCINIC MONOESTERS

[75] Inventors: Osamu Yamashita; Noboru Moriyama, both of Utsunomiya; Shoji Ootani, Oosaka; Katsuyo Wasamoto, Wakayama, all of Japan

[73] Assignee: KAO Corporation, Tokyo, Japan

[21] Appl. No.: 548,097

[22] Filed: Nov. 2, 1983

[30] Foreign Application Priority Data

Nov. 8, 1982 [JP] Japan .................. 57-195636
Dec. 24, 1982 [JP] Japan .................. 57-229555

[51] Int. Cl.$^4$ .................................. C07C 69/40
[52] U.S. Cl. .................................. 560/81; 252/142; 252/156; 252/174.21; 252/174.22; 252/174.24; 252/541; 252/546; 526/329.2; 526/329.7; 526/338; 526/340; 526/342; 526/347; 560/198; 560/201; 562/489; 562/583; 562/595
[58] Field of Search ............... 560/81, 198, 201; 252/546, 541, 142, 156, 174.21, 174.22, 174.24; 526/329.2, 329.7, 338, 340, 342, 347; 562/489, 595, 583

[56] References Cited

U.S. PATENT DOCUMENTS 4,048,065  9/1977  Suen et al. ................ 560/198 X

Primary Examiner—Natalie Trousof
Assistant Examiner—Vera C. Clarke
Attorney, Agent, or Firm—Oblon, Fisher, Spivak, McClelland & Maier

[57] ABSTRACT

Novel salts of alkenylsuccinic monoesters represented by the following formulas (I) or (II):

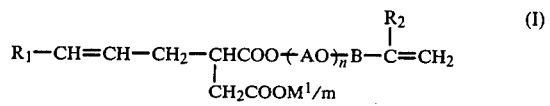

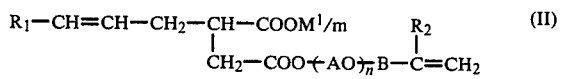

in which $R_1$ represents a hydrocarbon group, $R_2$ represents a hydrogen atom or a methyl group, A represents an alkylene group having from 2 to 4 carbon atoms, B represents a carbonyl group or a methylene group, M is a monovalent or divalent cation.

The monoesters can be emulsion-polymerized under optimum conditions while varying the hydrophilic and oleophilic balance depending on the type of monomer because they have hydrophobic hydrocarbon groups and oleophilic carboxylate groups and ether bonds of polyalkyleneoxy groups.

The compounds according to the invention are an excellent reactive surface active agent, and also useful as an improver or modifier for polymer because they can impart hydrophilicity to hydrophobic resins when they are used in larger amounts as in the case of reactive surface active agents employed for ordinary.

1 Claim, No Drawings

SALTS OF ALKENYLSUCCINIC MONOESTERS

BACKGROUND OF THE INVENTION (i) Field of the Invention:

This invention relates to salts of alkenylsuccinic monoesters having an acrylic or methacrylic acid residue (hereinafter referred to as ((meth)acrylic acid) as a radical-polymerizable group and represented by the formula (I) and/or (II)

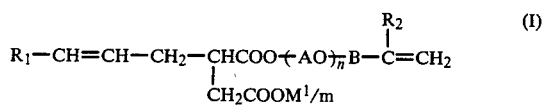

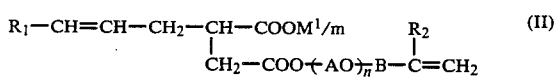

in which $R_1$ represents a hydrocarbon group with or without a substituent, $R_2$ represents a hydrogen atom or a methyl group, A represents an alkylene group having from 2 to 4 carbon atoms, B represents a carbonyl group or a methylene group, M is a monovalent or divalent cation, n is a value ranging from 0 to 100 provided that when B represents a carbonyl group, n is not a value of zero, and m is the number of the ionic valence of M, and also to reactive surface active agent compositions and polymer improvers both comprising the monoester salts.

(ii) Description of the Background:

It is the usual practice to effect the emulsion polymerization reaction using non-reactive surface active agents. In the resulting emulsion, however, the surface active agent does not homogeneously mix with polymer but remains as locally concentrated, so that when the polymer is shaped as a film, the surface active agent is taken in the film. This makes it difficult to obtain a polymer film of uniform quality. It is known that the non-uniform quality of the polymer film gives an adverse influence on various properties such as dyeing property, antistaticity, weatherability, chemical resistance and the like.

In order to overcome the above drawback, there have been developed and used reactive surface active agents which have both groups having the surface activity and polymerizable groups in the molecule thereof. This type of reactive surface active agent not only serves as an emulsifier for monomer, but also is gradually taken in polymer.

SUMMARY OF THE INVENTION

We have made intensive studies on reactive surface active agents and, as a result, found that the salts of alkenyl-succinic monoesters having a (meth)acrylic acid residue as a radical-polymerizable group and represented by the afore-indicated formula (I) or (II) in the molecule thereof are a useful reactive surface active agent. The monoesters can be emulsion-polymerized under optimum conditions while varying the hydrophilic and oleophilic balance depending on the type of monomer because they have hydrophobic hydrocarbon groups and oleophilic carboxylate groups and ether bonds of polyalkyleneoxy groups.

It has also been found that when the salts of alkenylsuccinic monoesters are used in larger amounts as in the case of reactive surface active agents employed for ordinary, emulsion polymerization, hydrophilicity can be imparted to hydrophobic resin. Thus the monoesters being useful as an improver or modifier for polymer.

The present invention is based on the above findings and provides novel salts of alkenylsuccinic monoesters of the afore-indicated formula (I) or (II), and reactive surface active agents and polymer improvers both comprising the monoesters.

DETAILED DESCRIPTION OF THE INVENTION AND PREFERRED EMBODIMENTS

The compounds of the formula (I) or (II) of the invention are prepared, for example, according to the following formula

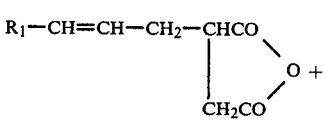

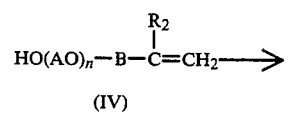

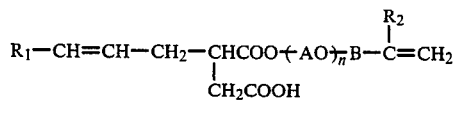

and

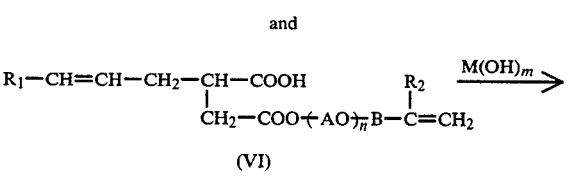

(I) and (II)

(in which $R_1$, $R_2$, A, B, M, n and m have the same meanings as defined before, respectively).

The compounds of the formula (III) which are one of the starting materials are obtained, for example, by subjecting alpha-olefins and maleic anhydride to addition reaction by any known technique. For instance, when an alpha-olefin used is dodecene, there is obtained dodecenylsuccinic anhydride. Use of octadecene results in formation of octadecenylsuccinic acid.

The compounds of the general formula (IV) can be broadly classified into the following categories including alkylene oxide adducts of acrylic or methacrylic acid represented by the follwoing formula (IVa)

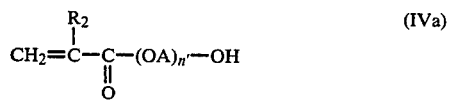

in which $R_2$ and A have, respectively, the same meanings as defined before, and n' is an integer of from 1 to 100, and allyl or methallyl alcohols represented by the following formula (IVb) and alkylene oxide adducts thereof

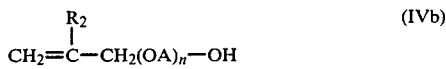

$$CH_2=\underset{\underset{R_2}{|}}{C}-CH_2(OA)_n-OH \quad \text{(IVb)}$$

in which $R_2'$, A and n have, respectively, the same meanings as defined before.

The compounds of the formula (IVa) should have active hydroxyl end groups. For instance, the compounds of the formula (IVa) in which n=1 include 2-hydroxyethylmethacrylate, 2-hydroxyethylacrylate, 2-hydroxypropylmethacrylate, 2-hydroxypropylacrylate, and the like. The compounds of the formula in which n is a value exceeding 1 include ethylene oxide adducts, propylene oxide adducts, butylene oxide adducts of (meth)acrylic acid, and block or random adducts thereof.

Of the compounds of the general formula (IVb), alkylene oxide adducts can be obtained, for example, by reacting an allyl or methallyl alcohol and an alkylene oxide in the presence of potassium hydroxide in an agitated autoclave.

The HLB value of the compound (I) and/or (II), when used as a invention active agent, can be arbitrarily controlled by suitable selection of the type of compound (IV) and the value of n.

In order to prepare compounds (V) and (VI) from compounds (III) and (IV), there may be used either a method in which the compound (III) is heated in a reactor into which the compound (IV) is dropped, or a method in which both compounds are charged at a time. The heating temperature is preferably in the range of from 90° to 130° C. when compound (IVa) is used, and in the range of from 90° to 160° C. for compound (IVb). The reaction may proceed in the absence of solvent. In order to inhibit polymerization of compound (IV), it is preferred to effect the reaction in the presence of known polymerization inhibitors such as, for example, hydroquinone monomethyl ether, hydroquinone, pyrogallol, catechol, benzoquinone, anthraquinone, phenothiazine, p-phenylenediamine, benzidine, nitrobenzene and the like. The thus prepared compounds (V) and (VI) are neutralized with known bases or aqueous solutions thereof, thus being converted to compounds (I) and (II) of the present invention. The bases used for the above purpose include inorganic bases such as sodium hydroxide, potassium hydroxide, lithium hydroxide, calcium hydroxide, magnesium hydroxide, ammonium hydroxide, and organic bases such as monoalkylamines, dialkylamines, trialkylamines, ethanolamine and the like. Upon the conversion of compounds (V) and (VI) into compounds (I) and (II) of the present invention, it is possible to regulate amounts of these bases so as to control the neutrality of the reaction system.

The thus obtained compounds (I) or (II) of the present invention can be used as a reactive surface active agent. Ethylenically unsaturated monomers capable of being emulsion polymerized with the agent are, for example: alpha, beta-unsaturated carboxylic acids and salts thereof such as styrene derivatives, vinyl esters, acrylic esters, methacrylic esters, acrylic acid, methacrylic acid, crotonic acid and the like; alpha, beta-unsaturated amides such as acrylamide, methacrylamide, N-methylacrylamide, N-methylolacrylamide and the like; and acrylonitrile, methacrylonitrile, vinyl chloride, vinylidene chloride, ethylene, alpha-olefins, conjugated diene compounds such as butadiene, alkyl vinyl ethers, alkyl vinyl ketones, maleic anhydride, maleic esters, itaconic esters, and the like. Also, within the scope of the polymerizable monomers are included crosslinkable divinyl compounds such as divinyl benzene, ethylene glycol dimethacrylate, methylene bisacrylamide, and the like.

The emulsion polymerization using the compound (I) or (II) of the present invention as a reactive surface active agent is effected at a temperature of from 0° C. to 100° C., preferably 20° to 90° C. The polymerization may be carried out in an inert gas using polymerization initiators and regulators.

Polymerization initiators and polymerizable ethylenically unsaturated monomers may be charged into a reactor by a method in which the amount of the initiators and monomers are charged upon commencement of the polymerization, or a method in which the materials are continuously charged as the polymerization reaction proceeds. These methods should be properly used depending on the reactivity of monomer and the composition of an intended copolymer. In the practice of the invention, ordinary emulsifiers may be optionally used in combination but a satisfactorily stable emulsion can be obtained using the reactive surface active agent alone of the present invention. Additionally even though ordinary emulsifiers are employed, it is sufficient to use them in amounts smaller than as used in an ordinary emulsion polymerization.

The polymerization initiators used in the present invention may be any known water-soluble radical polymerization initiators. For instance, there are used inorganic peroxides such as hydrogen peroxide, potassium persulfate, ammonium persulfate and the like, known water-soluble organic peroxides, and redox polymerization initiators using the above-indicated peroxides in combination with either reductive sulfoxide compounds such as sodium hydrogensulfite, sodium thiosulfate and the like, or ferrous sulfate.

The amount of compound (I) or (II) of the present invention used as the reactive surface active agent may vary depending on the type of polymer, the composition of monomer, and intended or required properties. In case where hydrophobic polymers are prepared in order to impart thereto dyeing and antistatic properties, it is usual to add the compound (I) or (II) of the invention to copolymers in an amount of 0.1 to 40 wt % (hereinafter referred to simply as %), preferably 0.2 to 30 wt %.

Compound (I) or (II) of the invention may also be used as a polymer improver. When compound (I) or (II) which is used as the reactive surface active agent is incorporated in copolymer in an amount of from 10 to 80%, preferably from 20 to 60%, hydrophilic polymers (e.g. swelling resins) can be obtained from monomers which are capable of preparing hydrophobic polymers.

It is possible to arbitrarily change properties of polymer by adding the compound (I) or (II) of the present invention to the polymer in amounts which depend on the purpose and use of the polymer. For instance, in order to obtain hydrophilic polymers (e.g. swelling resins) from monomers ordinarily used for preparing hydrophobic polymers, it is sufficient to add 10 to 80 wt %, preferably 20 to 60 wt % of the compound (I) or (II) of the present invention. In case where strippable coating films are caused to be formed, it is sufficient to add 1 to 40 parts by weight, preferably 2 to 25 parts by weight of the compound per 100 parts by weight of unsaturated vinyl monomer. In the latter case, the amount of the compound of the invention may, more or less, vary depending on the type of substrate being coated therewith and the strippability relative to the substrate. As a matter of course, known surface active agents for emulsion polymerization including, for example, alkylbenzenesulfonates, alkylsulfates, nonylphenolalkylene oxides, alkylalkylene oxides, and the like may be used in combination in such an amount that a film obtained from the resulting emulsion does not deteriorate in properties. The amount of the surface active agent used in combination is at most about 10 parts by weight per 100 parts by weight of unsaturated vinyl monomer.

Use of the reactive surface active agent of the present invention is effective in imparting, to various polymers, excellent dyeing, antistatic, waterproof and hydrophilic properties and good strippability. Polymers which are obtained using the reactive surface active agent of the present invention involve uniformly dispersed hydrophilic groups therein resulting from the surface active agent copolymerized, thereby improving the above-mentioned properties and particularly improving permanent antistaticity, anti-clouding property, miscibility with pigment, and strippability.

Even though the reactive surface active agents of the invention are used in large amounts in order to improve polymer, they are very likely to copolymerize and are not left in the polymer as they are. This is advantageous over known polymer improvers consisting of carboxyl group or sulfo group-containing monomers, such as sodium (meth)acrylate, sodium styrenesulfonate, sodium (meth)allylsulfonate, sodium 2-acrylamide, 2-methylpropanesulfonate, in that water-soluble polymers are not produced without involving deterioration of water resistance.

The reactive surface active agents of the invention can optionally vary in HLB value by controlling the type of hydrophobic hydrocarbon group and the number of hydrophilic alkylene oxide units, so that mechanical stability of an emulsion under polymerization is improved and environmental pollution by a surface active agent remaining in waste water from the reaction system can be prevented. The present invention is described by way of examples.

EXAMPLES

EXAMPLE 1

(i) Into a glass reactor equipped with a reflux condenser, an agitator, a dropping funnel and a thermometer were charged 26.6 g of anhydrous dodecenylsuccinic acid and 14 mg of hydroquinone monomethyl ether, followed by heating to 100° C. 13.0 g of 2-hydroxyethylmethacrylate was dropped in 2 hours and further agitation was continued for one hour.

As a result, there was obtained a light yellow liquid held as a liquid at a normal temperature.

According to the results of a measurement of infrared spectra of the liquid, absorptions at 1865 cm$^{-1}$ and 1780 cm$^{-1}$ corresponding to the carbonyl groups of the anhydrous dodecenylsuccinic acid and an absorption at 3500 cm$^{-1}$ based on the hydroxyl group of the 2-hydroxyethylmethacrylate disappeared. On the contrary, an absorption at 1780 cm$^{-1}$ of a freshly formed ester bond appeared as a shoulder of an absorption at 1710 cm$^{-1}$ corresponding to the cojugated ester bond of the methacrylic acid.

From NMR spectral results, it was confirmed that the liquid consisted of 1-methacryloyloxyethyl dodecenylsuccinate and 4-methacryloyloxyethyl dodecenyl succinate of the formulas (Va′) and (VIa′).

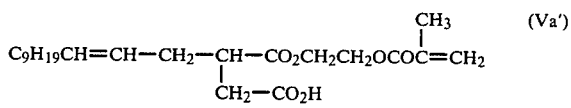

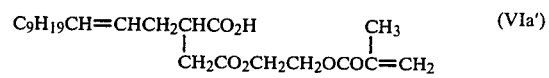

$^1$H—NMR (CDCl$_3$) delta: internal standard TMS
0.88 (3H, t, J = 7Hz), CH$_3$—
(alkyl end group)
1.1–1.5 (14H, m), —CH$_2$—
(alkyl group)

1.7–2.2 (7H, m)

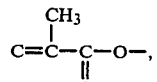
(methacrylic acid residue)

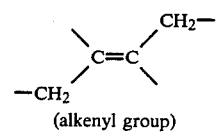
(alkenyl group)

2.2–2.4 (2H, m)
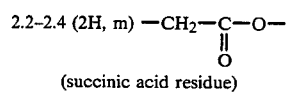
(succinic acid residue)

2.4–3.1 (1H, m)
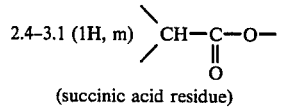
(succinic acid residue)

4.32 (4H, s) —O—CH$_2$CH$_2$—O—
(ethylene group)

5.2 5.8 (3H, m)
—CH=CH—
(alkenyl group)

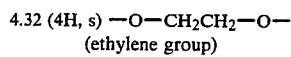
(terminal olefin)

6.11 (1H, s)
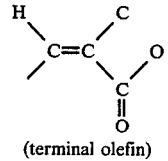
(terminal olefin)

10.2 (1H, 2) —CO$_2$H (ii) To the product obtained in (i) was added for neutralization an equivalent of 1N-KOH aqueous solution, thereby obtaining an aqueous 25% solution of potassium salts of 1-methacryloyloxyethyl dodecenylsuccinic monoester and 4-methacroyloxyethyl dodecenylsuccinate monoester.

EXAMPLES 2-4

32.2 g of anhydrous hexadecenylsuccinic acid was used instead of the anhydrous hexadodecenylsuccinic acid, and reacted with several (meth)acrylic acid derivatives under the same conditions as in (i) of Example 1, thereby obtaining compounds indicated in Table 1.

The resulting reaction products were all in the form of a light yellow viscous liquid at a normal temperature. From the results of IR and NMR measurements, it was confirmed that the products were the compounds indicated in Table 1, respectively.

These compounds were subsequently neutralized with an equivalent of KOH to obtain aqueous 25% solutions of potassium salts of the respective monoesters.

-continued
1.7-2.2 (7H, m)

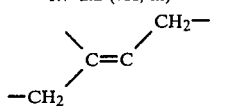

2.2-2.4 (2H, m) —CH$_2$—C—O—
$\parallel$
O
(succinic acid residue)

2.4-3.1 (1H, m) \CH—C—O—
/ $\parallel$
O
(succinic acid residue)

TABLE 1

| Example No. | (Meth)acrylic acid derivatives [amount] | Products [in formulas (V) and (VI)] | | | | |
|---|---|---|---|---|---|---|
| | | R$_1$ | R$_2$ | A | B | n |
| 2 | 2-hydroxyethylacrylate [11.6 g] | C$_{13}$H$_{27}$ | H | -(CH$_2$)- | O<br>—C— | 1 |
| 3 | 3 moles ethylene oxide adduct of 2-hydroxyethylmethacrylate<br>($\overline{M.W}$ = 280)<br>[28.0 g] | " | CH$_3$ | " | O<br>—C— | 3 |
| 4 | 6 moles ethylene oxide adduct of 2-hydroxyethylmethacrylate<br>($\overline{M.W}$ = 430)<br>[43.0 g] | " | " | " | O<br>—C— | 6 |

EXAMPLE 5

(i) 324 g of anhydrous dodecenylsuccinic acid, 58 g of allyl alcohol, and 140 mg of hydroquinone monomethyl ether were charged into a one liter reactor equipped with a reflux condenser, an agitator, a dropping funnel and thermometer, followed by agitating at 140° C.-150° C. for 5 hours, thereby obtaining a colorless liquid held as liquid at a normal temperature. The liquid had an acid value of 172.0 and a saponification value of 345.2.

According to the results of an infrared spectrum measurement of the liquid, there disappeared absorptions at 1865 cm$^{-1}$ and 1780 cm$^{-1}$ corresponding to carbonyl groups of the dodecenylsuccinic acid anhydride and an absorption at 3300 cm$^{-1}$ attributed to the hydroxyl group of the allyl alcohol. In contrast, an absorption at 1730 cm$^{-1}$ corresponding to the ester bond and an absorption at 1700 cm$^{-1}$ attributed to the carboxylic acid newly appeared.

Moreover, the results of NMR spectra revealed that the liquid consisted of 1-allyldodecenylsuccinic acid and 4-allyldodecenylsuccinic acid represented by the following formulas (Vb') and (VIb').

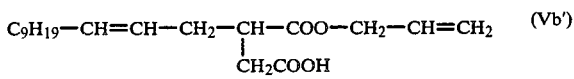  (Vb')

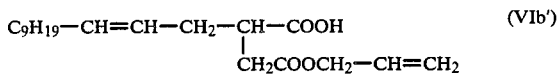  (VIb')

$^1$H—NMR (CCl$_4$) delta: internal standard TMS
0.88 (3H, t, J = 7Hz), CH$_3$—
(alkyl end group)
1.1-1.5 (14H, m), —CH$_2$—
(alkyl group)

4.6 (2H, m) —O—CH$_2$C=
(allyl group)
5.0-5.5 (2H, m) =CH$_2$
(allyl group)
5.4 (2H, m) —CH=CH—
(alkenyl group)
5.6-6.3 (1H, m) —CH=
(allyl group)
11.5 (1H, s) —CO$_2$H (ii) To the product obtained in (i) was added for neutralization an equivalent of 1N-KOH aqueous solution, thereby obtaining an aqueous 25% solution of potassium 1-allyldodecenylsuccinate and potassium 4-allyldodecenylsuccinate.

EXAMPLE 6

(i) Into the reactor used in Example 5 were charged 241 g of alkenylsuccinic anhydride (saponification value of 351, iodine value of 61) prepared from Diarene 168 (by Mitsubishi Chem. Co., Ltd., a mixture of alpha-olefins having 16 and 18 carbon atoms and an iodine value of 105) and maleic anhydride, and 130 g of 2 moles (on average) ethylene oxide adduct of allyl alcohol, followed by agitating in a stream of nitrogen at a temperature of 140°-150° C. for 5 hours, thereby obtaining a light yellow liquid which was kept liquid at a normal temperature.

The measurement of infrared spectrum of the liquid demonstrated that an absorption at 3450 cm$^{-1}$ attributed to the hydroxyl groups of the allyl alcohol and ethylene oxide adduct disappeared with appearance of characteristic absorptions similar to the case of Example 1.

From the NMR spectral results, it was confirmed that the liquid consisted of compounds represented by the following formulas (Vb'') and (VIb'').

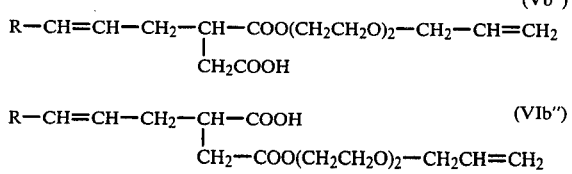

(Vb'')

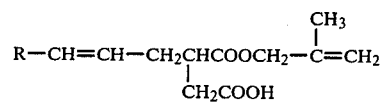

(VIb'')

in which R represents $C_{13}H_{27}-$ or $C_{15}H_{31}-$.

(ii) To the products obtained in (i) was added for neutralization an equivalent of 1N-NaOH aqueous solution, thereby obtaining an aqueous 25% solution of a salt of (Vb'') and/or (VIb'').

EXAMPLES 7–9

241 g of alkenylsuccinic acid anhydride as used in Example 6 was used and reacted with allyl alcohol derivatives indicated in Table 2 under the same conditions as in Example 5(i), thereby obtaining products.

TABLE 2

| Example No. | Allyl Alcohol Derivative [Amount] | Product [in formula (V) or (VI)] | | | | |
|---|---|---|---|---|---|---|
| | | $R_1$ | $R_2$ | A | B | n |
| 7 | 5 moles (on average) EO* adduct of allyl alcohol [262 g] | $C_{13}H_{27}-$ $C_{16}H_{31}-$ | H | $-CH_2-CH_2-O-$ | $-CH_2-$ | 5 |
| 8 | 2 moles (on average) PO** adduct of allyl alcohol [173 g] | $C_{13}H_{27}-$ $C_{16}H_{31}-$ | H | $\begin{array}{c} CH_3 \\ \| \\ -CH_2-CH-O- \end{array}$ | $-CH_2-$ | 2 |
| 9 | 5 moles (on average) PO adduct of allyl alcohol [332 g] | $C_{13}H_{27}-$ $C_{16}H_{31}-$ | H | $\begin{array}{c} CH_3 \\ \| \\ -CH_2-CH-O- \end{array}$ | $-CH_2-$ | 2 |

Note
*EO: Ethylene oxide
**PO: Propylene oxide

EXAMPLE 10

The procedure of Example 6 was repeated using 72 g of methacryl alcohol instead of 130 g of the 2 moles (on average) ethylene oxide adduct of allyl alcohol, thereby obtaining a light yellow or yellow liquid which was kept as liquid at a normal temperature.

The liquid had an acid value of 143.1, a saponification value of 286.2, and an iodine value of 114.6. An instrumental analysis revealed that the liquid consisted of compounds of the following formulas.

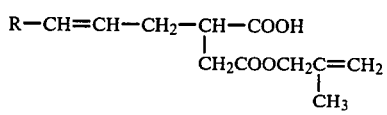

(in which R represents $C_{13}H_{27}-$ or $C_{15}H_{31}-$).

EXAMPLE 11

The general procedure of Example 10 was repeated using equimolar amounts of alkylene oxide adducts of methacryl alcohol indicated in Table 3 below instead of 72 g of methacryl alcohol, thereby obtaining compounds indicated in the Table.

TABLE 3

| Compound [in Formula (I) or (II)] | | | | | Analytical and Calculated Values | | |
|---|---|---|---|---|---|---|---|
| $R_1$ | $R_2$ | A | B | n | Acid Value | Saponification Value | Iodine Value |
| $C_{13}H_{27}-$ $C_{16}H_{31}-$ | $CH_3-$ | $-CH_2CH_2-O-$ | $-CH_2-$ | 2 | 116.8 | 233.7 | 93.6 |
| $C_{13}H_{27}-$ $C_{16}H_{31}-$ | " | " | " | 5 | 91.6 | 183.2 | 73.4 |
| $C_{13}H_{27}-$ $C_{16}H_{31}-$ | " | " | " | 10 | 73.8 | 147.6 | 54.4 |
| $C_{13}H_{27}-$ $C_{16}H_{31}-$ | " | " | " | 50 | 22.2 | 44.5 | 17.5 |
| $C_{13}H_{27}-$ $C_{16}H_{31}-$ | " | $\begin{array}{c} CH_3 \\ \| \\ -CH_2CH-O- \end{array}$ | " | 2 | 110.4 | 220.8 | 50.0 |
| $C_{13}H_{27}-$ $C_{16}H_{31}-$ | " | " | " | 5 | 82.2 | 164.4 | 37.2 |
| $C_{13}H_{27}-$ $C_{16}H_{31}-$ | " | " | " | 10 | 57.7 | 115.3 | 26.1 |

EXAMPLE 12

The reactive surface active agents obtained in Examples 1 through 4 were used to effect the emulsion polymerization reaction.

The resulting polymer emulsions were subjected to measurements with regards to polymerization stability, polymerization conversion and mechanical stability. Moreover, dried films obtained from the polymer emulsions were measured to determine water resistance, and moisture and water absorptions. The results are shown in Table 4.

Polymerization Method 50 g of water, 0.5 g of ammonium persulfate, and 0.75 g of sodium hydrogencarbonate were charged into a reactor equipped with an agitator, a thermometer, a reflux condenser, a nitrogen feed port, and dropping funnel and the air in the system was replaced by a nitrogen gas, followed by heating to 70° C. Into the reactor was dropped, while agitating, an emulsion, which was obtained by adding, to water, a predetermined amount of each reactive surface active agent and a predetermined amount of an intended type of monomer, from the dropping funnel over 2 hours. After completion of the dropping, the system was agitated for further 2 hours at 70° C., thereby obtaining a polymer emulsion.

Monomer Compositions (weight ratio)

Composition a: butyl acrylate/styrene (50/50)

A coagulant which was produced in the Malon tester after agitation for 5 minutes under a load of 10 kg was expressed by wt % relative to solid matters in a tested emulsion.

Moisture Absorption:

A 0.3 mm thick film was made from a tested emulsion and was dried under conditions of 40° C. and 30% R.H. for 24 hours. Thereafter, the dried film was allowed to stand under conditions of 20° C. and 95% R.H., after which a moisture absorption per unit area as measured.

Water Absorption:

This is a water absorption per unit area after immersion of a 0.3 mm thick film, prepared from a tested emulsion, for 24 hours.

Water Resistance:

The water resistance was evaluated, as a time required before an about 0.3 mm thick film turned clouded upon immersion in water, according to the following evaluation standard. °: over one day, o: over one hour, x: below one hour, xx: instantaneously

TABLE 4

| Surface Active Agent | Monomer Composition | Amount | Polymerization Conversion | Polymerization Stability | Mechanical Stability | Moisture Absorption | Water Absorption | Water Resistance |
|---|---|---|---|---|---|---|---|---|
| Products of Invention | | | | | | | | |
| Example 2 | a | 3 | 100 | 0.44 | 8.72 | * | * | |
| " | b | 3 | 99.2 | 0.44 | 0.00 | * | * | |
| " | c | 3 | 98.5 | 0.35 | 0.55 | * | * | |
| Example 1 | a | 3 | 97.6 | 0.95 | 5.38 | * | * | |
| Example 3 | a | 3 | 98.6 | 0.54 | 6.59 | * | * | |
| Example 4 | a | 3 | 99.1 | 0.43 | 7.16 | * | * | |
| Example 2 | a | 5 | 100 | 0.49 | 4.18 | 0.358 | 203 | |
| " | a | 10 | 100 | 0.53 | 0.00 | 0.895 | 418 | |
| " | a | 20 | 95.0 | 1.03 | 0.00 | 1.978 | 961 | |
| Comparative Products | | | | | | | | |
| { LAS | | 3 | | | | | | |
| { Sodium Methacrylate | a | 5.4 | 100 | 0.80 | 0.80 | 1.593 | 139 | |
| { LAS | | 3 | | | | | | |
| { Sodium Styrenesulfonate | a | 10 | 76.2 | 4.22 | 16.22 | 3.094 | ** | XX |
| Perex SS+ | a | 5 | 100 | 0.37 | 18.98 | 1.329 | 80 | X |
| " | a | 10 | 100 | 0.12 | 2.04 | 1.959 | ** | XX |
| " | a | 20 | 100 | 0.01 | 0.27 | 3.524 | ** | XX |

(Note 1)* Not measured.
(Note 2)** Because dispersion in water took place, it was impossible to measure.
(Note 3)+ Perex SS Disodium dodecyldiphenyl ether disulfonate Composition b: styrene/methyl methacrylate/butyl acrylate (30/30/40)
Composition c: styrene/methyl methacrylate/butyl acrylate (30/35/35)

Measurements and Evaluation

Polymerization Stability:

The emulsion was filtered through a 100 mesh gauze and the resulting cake was washed and dried at 105° ±2° C. for 12 hours, thereby obtaining a dried matter. The dry weight of the dried matter based on the employed monomers was expressed by wt %.

Mechanical Stability:

EXAMPLE 13

The reactive surface active agents obtained in Examples 5 to 9 were used to effect the emulsion polymerization reaction.

The resulting polymer emulsions were subjected to measurements of polymerization stability, polymerization conversion and mechanical stability, and dry films obtained from the respective emulsion were measured to determine their water resistance. The results are shown in Table 5. A monomer composition used was mixture of butyl acrylate and styrene (50/50 on the weight basis). The polymerization method and the measurements and evaluation were effected in the same manner as in Example 12.

TABLE 5

| Surface Active Agent | Amount (g) | Polymerization Stability (%) | Polymerization Conversion (%) | Mechanical Stability (%) | Water Resistance |
|---|---|---|---|---|---|
| Products of Convention | | | | | |
| Example 5 | 3 | 0.11 | 93.7 | 20.0 | O |
| | 5 | 0.12 | 95.5 | 12.8 | O |

TABLE 5-continued

| Surface Active Agent | Amount (g) | Polymerization Stability (%) | Polymerization Conversion (%) | Mechanical Stability (%) | Water Resistance |
| --- | --- | --- | --- | --- | --- |
| | 10 | 0.13 | 97.3 | 6.31 | O |
| Example 6 | 3 | 2.71 | 94.5 | 12.3 | O |
| | 5 | 0.70 | 96.7 | 9.7 | O |
| | 10 | 0.15 | 97.0 | 3.0 | O |
| Example 7 | 3 | 0.83 | 93.7 | 47.6 | O |
| | 5 | 0.70 | 96.7 | 9.7 | O |
| | 10 | 0.34 | 99.8 | 0.9 | O |
| Example 8 | 3 | 0.37 | 90.0 | 27.2 | O |
| | 5 | 2.61 | 96.8 | 5.3 | O |
| | 10 | 1.42 | 100 | 7.4 | O |
| Example 9 | 3 | 1.46 | 90.2 | 13.2 | O |
| | 5 | 1.00 | 96.4 | 13.2 | O |
| | 10 | 0.81 | 98.5 | 12.2 | O |
| Comparative Products | | | | | |
| ⎧ LAS | 3 | | | | |
| ⎨ Sodium Styrenesulfonate | 10 | 42.2 | 76.2 | 16.2 | XX |
| PerexSS+ | 5 | 0.37 | 100 | 19.0 | X |
| " | 10 | 0.12 | 100 | 2.0 | XX |

EXAMPLE 14

Into a one liter glass reactor equipped with a reflux condenser, an agitator, a nitrogen gas fed pipe, and a thermometer were charged 175 g of an aqueous solution containing 10 g of a mixture of sodium allylhexadecenyl succinates of the formula (I) or (II) [in which $R_1=C_{13}H_{27}$, $R_2=H$, $B=-CH_2-$, $M=Na$, $m=1$, and $n=0$], 50 g of styrene, and 50 g of butyl acrylate, followed by agitating for emulsification. Thereafter, the reaction system was maintained at about 75° C., to which was added 0.5 g of ammonium persulfate while introducing nitrogen gas thereinto, followed by agitating for further 3 hours, thereby obtaining an emulsion for strippable coating having a solid content of about 40 wt % and a viscosity of 92 cps.

EXAMPLE 15

158 g of an aqueous solution containing 3 g of a mixture of sodium allyloctadecenyl succinates of the formula (I) or (II) [in which $R_1=C_{15}H_{31}$, $R_2=H$, $B=-CH_2-$, $M=Na$, $m=1$ and $n=0$], 50 g of styrene, and 50 g of butyl acrylate were charged into a glass reactor of the same type as used in Example 14, followed by treating in the same manner as in Example 14, thereby obtaining an emulsion for strippable coating having a solid content of 40 wt % and a viscosity of 37 cps.

EXAMPLE 16

163 g of an aqueous solution containing 5 g of a mixture of potassium methallylpolyoxyethylene (5 moles added) hexadecenyl succinates of the formula (I) or (II) in which $R_1=C_{13}H_{27}$, $R_2=CH_3$, $A=-CH_2CH_2-$, $B=-CH_2-$, $M=K$, $m=1$ and $n=5$, 50 g of styrene, and 50 g of 2-ethylhexyl acrylate were charged into a glass reactor of the same type as used in Example 14, followed by treating in the same manner as in Example 14, thereby obtaining an emulsion for strippable coating having a solid content of about 40 wt % and a viscosity of 68 cps.

EXAMPLE 17

225 g of an aqueous solution containing 30 g of a mixture of ammonium 1-allylpolyoxypropylene (20 moles added) dodecenyl succinates of the formula (I) or (II) in which $R_1=C_9H_{19}$, $R_2=H$, $A=-CH_2CH_2-$, $B=-CH_2-$, $M=NH_4$, $m=1$ and $n=20$, 60 g of styrene, and 40 g of 2-ethylhexyl acrylate were charged into a glass reactor of the same type as used in Example 14, followed by treating in the same manner as in Example 14, thereby obtaining an emulsion for strippable coating having solid content of about 40 wt % and a viscosity of 420 cps.

EXAMPLE 18

213 g of an aqueous solution containing 25 g of a mixture of potassium 1-methallylpolyoxyethylene (30 moles added) eiconyl succinates of the formula (I) or (II) in which $R_1=C_{17}H_{35}$, $R_2=CH_3$, $A=-CH_2CH_2-$, $B=-CH_2-$, $M=K$, $m=1$ and $n=30$, 50 g of styrene, and 50 g of butyl acrylate were charged into a glass reactor of the same type as used in Example 14, followed by treating in the same manner as in Example 14, thereby obtaining an emulsion for strippable coating having a solid content of about 40 wt % and a viscosity of 410 cps.

EXAMPLE 19

175 g of an aqueous solution containing 10 g of a mixture of monoethanolammonium 1-allylpolyoxyethylene (20 moles added) tetraeiconyl succinates of the formula (I) or (II) in which $R_1=C_{21}H_{43}$, $R_2=H$, $A=-CH_2CH_2-$, $B=-CH_2-$, $M=NH_3C_2H_4OH$, $m=1$ and $n=20$, 50 g of methyl methacrylate, 30 g of 2-ethylhexyl acrylate and 20 g of acrylonitrile were charged into a glass reactor of the same type as used in Example 14, followed by treating in the same manner as in Example 14, thereby obtaining an emulsion for strippable coating having solid content of about 40 wt % and a viscosity of 65 cps.

EXAMPLE 20

The strippable emulsions prepared in Examples 14 through 19 were tested to determine strippability and adherence or attachability with respect to plates of stainless steel, aluminium, glass, tile, acryl resin, acrylnitrile-butadiene-styrene rubber (hereinafter referred to simple as ABS), and vinyl chloride resin. The test was effected as follows: each emulsion was applied to the respective test plates in a thickness of 125 using an applicator and dried at 70° C. for 10 minutes to form a film, and the film was peeled at one end and taken off by fingers to judge strippability of the film and presence or absence of pieces of the film remaining on test plate (adherence) according to the following evaluation standards, respectively. The test results are shown in Table 6.

[Strippability]

o: Film is readily stripped off without breakage.
X: Film is not readily stripped off and remains on a plate as broken pieces.

Adherence o: No solid matter is visually observed as remaining on a plate and the plate surface is smooth to the touch.
X: Solid matter is visually observed on a plate and is sticky to the touch with fingerprint being left on the plate.

TABLE 6

| Test Plate | Test Item | Invention Products Example No. | | | | | | Comparative Products* | | | |
|---|---|---|---|---|---|---|---|---|---|---|---|
| | | 14 | 15 | 16 | 17 | 18 | 19 | 1 | 2 | 3 | 4 |
| Stainless steel | Strippability | O | O | O | O | O | O | X | O | O | O |
| | Adherence | O | O | O | O | O | O | X | X | X | X |
| Aluminium | Strippability | O | O | O | O | O | O | X | O | O | O |
| | Adherence | O | O | O | O | O | O | X | X | X | X |
| Glass | Strippability | O | O | O | O | O | O | X | O | O | O |
| | Adherence | O | O | O | O | O | O | X | X | X | X |
| Tile | Strippability | O | O | O | O | O | O | X | O | O | O |
| | Adherence | O | O | O | O | O | O | X | X | X | X |
| Nylon | Strippability | O | O | O | O | O | O | X | O | O | O |
| | Adherence | O | O | O | O | O | O | X | X | X | X |
| Acryl resin | Strippability | O | O | O | O | O | O | X | X | X | X |
| | Adherence | O | O | O | O | O | O | X | X | X | X |
| ABS resin | Strippability | O | O | O | O | O | O | X | O | O | X |
| | Adherence | O | O | O | O | O | O | X | X | X | X |
| Vinyl chloride | Strippability | O | O | O | O | O | O | X | X | X | X |
| | Adherence | O | O | O | O | O | O | X | X | X | X |

Product 1: Emulsion obtained by repeating the procedure of Example 14 using, instead of sodium allylhexadecyl succinate, sodium dodecylbenzenesulfonate and having a solid content of 40 wt % and a viscosity of 620 cps.

Product 2: Emulsion obtained by repeating the procedure of Example 14 using, instead of 10 g of sodium allylhexadecyl succinate, 1 g of sodium dodecylsulfuric ester and 9 g of polyoxyethylene (20 moles added) nonylphenol ether and having a solid content of about 40 wt % and a viscosity of 83 cps.

Product 3: 200 g of an aqueous solution containing 20 g of sodium polyoxyethylene (20 moles added) nonylphenolsulfonate, 50 g of styrene and 50 g of butyl acrylate were reacted in a reactor of the same type as used in Example 14 in the same manner as in Example 14. The resulting emulsion had a solid content of 40 wt % and a viscosity of 730 cps.

Product 4: Emulsion obtained by repeating the procedure of Example 14 using, instead of sodium allylhexadecyl succinate, sodium polyoxyethylene (23 moles added) octadecylsufonate and having a solid content of about 40 wt % and a viscosity of 405 cps.

As will be seen from the above results, the films formed from the strippable emulsions of the invention are more readily strippable with respect to various types of materials and do not pollute the materials therewith.

What is claimed is:

1. A salt of an alkenylsuccinic monoester represented by the formula (I), (II) or mixtures thereof

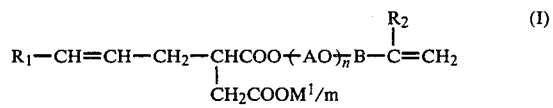

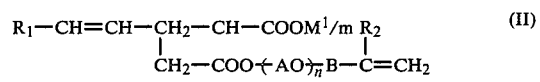

in which $R_1$ represents a hydrocarbon group with or without a substituent,
$R_2$ represents a hydrogen atom or a methyl group,
A represents an alkylene group having from 2 to 4 carbon atoms,
B represents a carbonyl group or a methylene group,
M is a monovalent or divalent cation selected from the group consisting of sodium, potassium, lithium, calcium, magnesium, ammonium, monoalkylammonium, dialkylammonium, trialkylammonium and ethanolammonium,
n has a value ranging from 0 to 100, provided that when B represents a carbonyl group, n is not zero, and
m is the number of the ionic valence of M.

* * * * *